(12) United States Patent
Hou et al.

(10) Patent No.: US 12,537,887 B2
(45) Date of Patent: Jan. 27, 2026

(54) FOLDABLE SUPPORT MEMBER AND DISPLAY DEVICE

(71) Applicant: KunShan Go-Visionox Opto-Electronics Co., Ltd, Jiangsu (CN)

(72) Inventors: Hongqi Hou, Jiangsu (CN); Liwei Ding, Jiangsu (CN); Fu Liao, Jiangsu (CN); Zhaoji Zhu, Jiangsu (CN); Yuhua Wu, Jiangsu (CN); Kanglong Sun, Jiangsu (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 394 days.

(21) Appl. No.: 18/169,241

(22) Filed: Feb. 15, 2023

(65) Prior Publication Data

US 2023/0199091 A1    Jun. 22, 2023

Related U.S. Application Data

(63) Continuation of application No. PCT/CN2021/114239, filed on Aug. 24, 2021.

(30) Foreign Application Priority Data

Nov. 9, 2020    (CN) .......................... 202011241599.X

(51) Int. Cl.
*H04M 1/02*    (2006.01)
(52) U.S. Cl.
CPC ....... *H04M 1/0216* (2013.01); *H04M 1/0268* (2013.01)
(58) Field of Classification Search
CPC .. H04M 1/0216; H04M 1/0268; H04M 1/022; G06F 1/1652; G06F 1/1681; G09F 9/301; F16C 11/04
See application file for complete search history.

(56) References Cited

U.S. PATENT DOCUMENTS

2018/0295735 A1*  10/2018  Ahn .................. G06F 1/1641
2019/0090364 A1*  3/2019  Shin .................. H10K 59/40
(Continued)

FOREIGN PATENT DOCUMENTS

CN        108922408 A      11/2018
CN        208421695 U       1/2019
(Continued)

OTHER PUBLICATIONS

Office Action issued on Oct. 17, 2023, in corresponding Japanese Application No. 2023-511877, 12 pages.
(Continued)

*Primary Examiner* — Dhaval V Patel
(74) *Attorney, Agent, or Firm* — Maier & Maier, PLLC

(57) ABSTRACT

A foldable support member and a display device. The foldable support member has a folding state and an unfolding state. The foldable support member includes a rotating shaft portion including a fixing shaft formed by extending in a first direction and a rotating assembly rotatably connected to the fixing shaft, a support plate including a connecting portion and an unfolding portion connected to the connecting portion, in which the connecting portion is fixed to the fixing shaft and the unfolding portion is arranged to be foldable around the fixing shaft relative to the connecting portion. The unfolding portion is slidably connected to the rotating assembly in a circumferential direction of the fixing shaft, and the unfolding portion is slidable in the circumferential direction along the rotating assembly when the foldable support member is switched between the folding state and the unfolding state.

20 Claims, 12 Drawing Sheets

(56) References Cited

U.S. PATENT DOCUMENTS

| | | | | |
|---|---|---|---|---|
| 2019/0204873 A1* | 7/2019 | Kim | ............... | G09F 9/301 |
| 2020/0379516 A1* | 12/2020 | Park | ............... | H04M 1/0268 |
| 2022/0192037 A1* | 6/2022 | Han | ............... | G06F 1/203 |
| 2022/0413555 A1* | 12/2022 | Ma | ............... | G06F 1/1624 |
| 2023/0100341 A1* | 3/2023 | Feng | ............... | G06F 1/1624 |
| | | | | 361/679.27 |
| 2024/0275875 A1* | 8/2024 | Ryu | ............... | G06F 3/03545 |

FOREIGN PATENT DOCUMENTS

| | | | |
|---|---|---|---|
| CN | 208686793 U | 4/2019 | |
| CN | 110493386 A | 11/2019 | |
| CN | 110599907 A | 12/2019 | |
| CN | 209990773 U | 1/2020 | |
| CN | 108520701 B | 3/2020 | |
| CN | 111277690 A | 6/2020 | |
| CN | 111343310 A | 6/2020 | |
| CN | 111583791 A | 8/2020 | |
| CN | 211378428 U | 8/2020 | |
| CN | 111692196 A | 9/2020 | |
| CN | 111833725 A | 10/2020 | |
| CN | 111901458 A | 11/2020 | |
| EP | 3876504 A1 | 12/2019 | |
| KR | 1020180076271 A | 7/2018 | |
| KR | 20200103111 A | 9/2020 | |
| WO | 03047218 A1 | 6/2003 | |
| WO | 2018186024 A1 | 10/2018 | |
| WO | 2019190213 A1 | 10/2019 | |
| WO | 2020186889 A1 | 9/2020 | |

OTHER PUBLICATIONS

International Search Report mailed Oct. 26, 2021, in International Application No. PCT/CN2021/114239, 6 pages.

First Office Action issued on Jul. 14, 2022, in corresponding China Application No. 202011241599.X, 10 pages Including Partial English-language translation.

First Office Action issued on May 30, 2022, in corresponding Taiwan Application No. 110133279, 10 pages Including Partial English-language translation.

Rejection Decision issued on Oct. 19, 2022, in Taiwan Application No. 110133279, 5 pages Including Partial English-language translation.

Extended Search Report issued on Nov. 22, 2023, in corresponding European Application No. 21888256.1, 10 pages.

Office Action issued on Jan. 12, 2024, in corresponding Korean Application No. 10-2023-7004236, 12 pages.

Office Action issued on Aug. 28, 2024, in corresponding Korean Application No. 10-2023-7004236, 4 pages.

* cited by examiner

FOLDABLE SUPPORT MEMBER AND DISPLAY DEVICE

CROSS REFERENCE TO RELATED APPLICATION

The present application is a continuation of International Application No. PCT/CN2021/114239, filed on Aug. 24, 2021, which claims priority to Chinese Patent Application No. 202011241599.X, filed on Nov. 9, 2020, titled "FOLDABLE SUPPORT MEMBER AND DISPLAY DEVICE", both of which are hereby incorporated by reference in their entireties.

TECHNICAL FIELD

The present disclosure relates to the technical field of display devices, and in particular to a foldable support member and a display device.

BACKGROUND

Since the release of folding screen mobile phones, global mobile phone manufacturers have successively launched their own folding screen mobile phone products. Whether it is inward folding, outward folding, horizontal folding or vertical folding, folding screens have become the direction that many manufacturers are vying for layout. The mobile phone industry has ushered in a new track.

However, due to the limitation of the folding structure, when the folding screen mobile phone realizes internal bending or external bending, we need to deal with the length change caused by the closing or opening of the shaft. The length change may cause the display screen to be stretched or squeezed, thereby reducing the service life of the display screen, making the display screen invalid and unable to display normally.

Therefore, there is an urgent need for a new foldable support member and display device.

SUMMARY

Embodiments of the present application provide a foldable support member and a display device, aiming at solving the problem that the dimension difference of the foldable support member between in a folding state and in an unfolding state is too great.

In a first aspect, the embodiments of the present application provide a foldable support member. The foldable support member has a folding state and an unfolding state. The foldable support member includes a rotating shaft portion including a fixing shaft formed by extending in a first direction and a rotating assembly rotatably connected to the fixing shaft, a support plate including a connecting portion and an unfolding portion connected to the connecting portion, in which the connecting portion is fixed to the fixing shaft and the unfolding portion is arranged to be foldable around the fixing shaft relative to the connecting portion. The unfolding portion is slidably connected to the rotating assembly in a circumferential direction of the fixing shaft, and the unfolding portion is slidable in the circumferential direction along the rotating assembly when the foldable support member is switched between the folding state and the unfolding state.

In a second aspect, the embodiments of the present application provide a display device including the foldable support member according to any one of the above-mentioned embodiments in the first aspect.

In the foldable support member in the embodiments of the present application, the foldable support member includes the rotating shaft portion and the support plate. The rotating shaft portion includes the fixing shaft and a rotating assembly, and the support plate includes the connecting portion and the unfolding portion. The connecting portion is fixed on the fixing shaft, and the unfolding portion is connected to the rotating assembly, so that the rotating assembly can drive the unfolding portion to rotate around the fixing shaft, in other words, the rotating assembly can drive the unfolding portion to fold around the connecting portion, so as to realize the folding and unfolding of the support plate. The unfolding portion is slidably arranged in the circumferential direction relative to the connecting portion. When the foldable support member is switched between the folding state and the unfolding state, the unfolding portion can move in a direction close to or away from the fixing shaft, so that it can prevent the connecting portion from being stretched or squeezed when the support plate is folded, and can reduce the deformation amount of the support plate when the support plate is folded. Therefore, the foldable support member in the embodiments of the present application can reduce the deformation amount of the support plate when the support plate is folded, thereby reducing the deformation amount of a to-be-supported member when the to-be-supported member is folded and improving the service life of the to-be-supported member.

DETAILED DESCRIPTION

Figure 1:
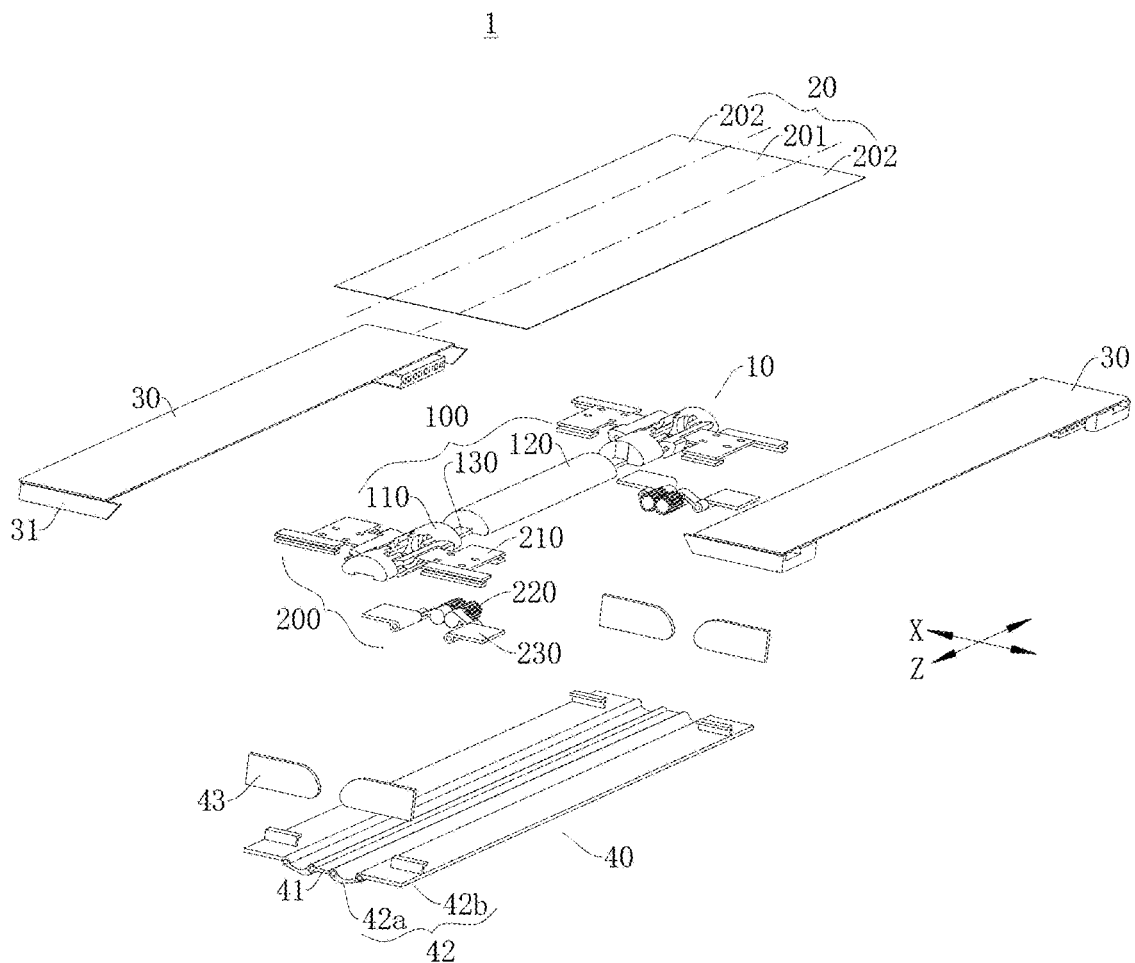
FIG. 1 shows a structural schematic view of a foldable member in an exploded state provided by an embodiment of a first aspect of the present application.

In order to better understand the present application, a foldable support member and a display device in embodiments of the present application will be described in detail below with reference to FIGS. 1 to 17.

According to the foldable support member 1 of the embodiments of the present application, the foldable support member 1 has a folding state and an unfolding state. The foldable support member includes a rotating shaft portion 10 including a fixing shaft 100 formed by extending in a first direction (direction Z in FIG. 1) and a rotating assembly 200 rotatably connected to the fixing shaft 100, a support plate 20 including a connecting portion 201 and an unfolding portion 202 connected to the connecting portion, in which the connecting portion 201 is fixed to the fixing shaft 100, and the unfolding portion 202 is arranged to be foldable around the fixing shaft 100 relative to the connecting portion. Herein, the unfolding portion 202 is slidably connected to the rotating assembly 200 in a circumferential direction of the fixing shaft 100, so that the unfolding portion 202 is enable to slide in the circumferential direction along the rotating assembly 200 when the foldable support member 1 is switched between the folding state and the unfolding state.

The circumferential direction of the fixing shaft 100 refers to the circumferential direction that starts from a center line of the fixing shaft 100 and radiates outward in a direction away from the fixing shaft 100 on a plane perpendicular to the fixing shaft. When the unfolding portion 202 slides in the circumferential direction along the rotating assembly 200, the unfolding portion 202 can approach the fixing shaft 100 or move away from the fixing shaft 100. Since the connecting portion 201 is fixed to the fixing shaft 100, when the unfolding portion 202 slides in the circumferential direction along the rotating assembly 200, the unfolding portion 202 can approach the connecting portion 201 or move away from the connecting portion 201.

In the embodiment of the present application, the connecting portion 201 of the foldable support member 1 is fixed to the fixing shaft 100, and the unfolding portion 202 is connected to the rotating assembly 200, so that the rotating assembly 200 can drive the unfolding portion 202 to rotate around the fixing shaft 100, in other words, the rotating assembly 200 can drive the unfolding portion 202 to fold around the connecting portion 201, so as to realize the folding and unfolding of the support plate 20.

The unfolding portion 202 is slidably arranged in the circumferential direction relative to the connecting portion 201. When the foldable support member 1 is switched between the folding state and the unfolding state, the unfolding portion 202 can move in a direction close to or away from the fixing shaft 100, so that it can prevent the connecting portion 201 from being stretched or squeezed when the support plate 20 is folded, and can reduce the deformation amount of the support plate 20 when the support plate is folded. Therefore, the foldable support member 1 in the embodiments of the present application can reduce the deformation amount of the support plate 20 when the support plate is folded, thereby reducing the deformation amount of a to-be-supported member when the to-be-supported member is folded and improving the service life of the to-be-supported member.

There are many ways to arrange the support plate 20. In some optional embodiments, the support plate 20 is made of a material with a smaller elastic modulus, for example, the material of the support plate 20 is a steel plate. The steel plate material can further reduce the amount of deformation generated when the support plate 20 is folded.

The support plate 20 can be integrally formed, that is, the connecting portion 201 and the unfolding portion 202 are integrally formed, so that the support plate 20 has a relatively smooth support surface, which can reduce the scratch damage of the to-be-supported member caused by the support plate 20.

There are many ways to arrange the unfolding portion 202 and the rotating assembly 200 to slide with each other. For example, a sliding groove is arranged on a surface of the unfolding portion 202 facing the rotating assembly 200. The sliding groove is formed by extending in the circumferential direction. The unfolding portion 202 can be slidably arranged relative to the rotating assembly 200 by the sliding groove.

In some other optional embodiments, the foldable support member further includes a sliding portion 30. The unfolding portion 202 of the support plate 20 is connected to the rotating assembly 200 by the sliding portion 30. The sliding portion 30 is slidably arranged relative to the rotating assembly 200 in the circumferential direction, and the connecting portion 201 is fixed to the sliding portion 30. The unfolding portion 202 is driven to slide relative to the rotating assembly 200 by the sliding portion 30.

There are many ways to fix the support plate 20 to the fixing shaft 100, for example, the connecting portion 201 of the support plate 20 can be bonded to the fixed shaft 100, or the connecting portion 201 of the support plate 20 can be welded to the fixing shaft 100.

Figure 2:
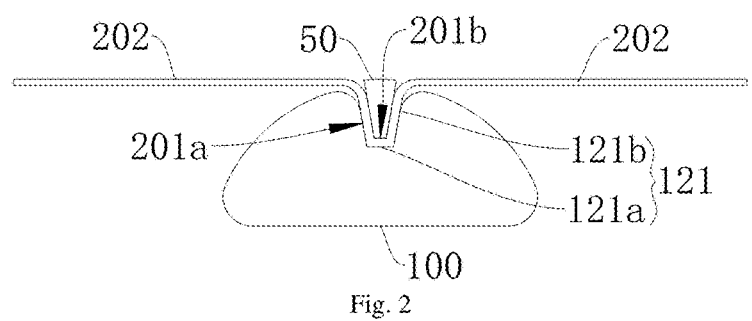
FIG. 2 shows a partial structural schematic view of a foldable member provided by an embodiment of the first aspect of the present application.

Referring to FIG. 1 and FIG. 2 together, a mounting groove 121 is formed in a recess on the fixing shaft 100. The connecting portion 201 of the support plate 20 is provided with a convex portion 201a protruding and extending towards a side and a concave portion 201b arranged on the convex portion 201a. The convex portion 201a is located in the mounting groove 121. The foldable support member 1 further includes an extruding block 50 located in the concave portion 201b, and the extruding block 50 is in interference fit with the concave portion 201b.

The convex portion 201a is formed by folding the connecting portion 201. The convex portion 201a has an outer surface for contacting and fitting with an inner surface of the mounting groove 121. The concave portion 201b further has an accommodating cavity for mounting the extruding block 50 and a mounting opening communicating with the accommodating cavity. The extruding block 50 is extruded into the accommodating cavity of the concave portion 201b from the mounting opening, so as to fix the connecting portion 201 in the mounting groove 121 on the fixing shaft 100.

Optionally, the mounting groove 121 is arranged close to a middle portion of the fixing shaft 100 in the first direction, so that the stresses on each position of the connecting portion 201 are more balanced.

In some embodiments, the mounting groove 121 includes a bottom surface 121a, two side surfaces 121b connected to the bottom surface 121a at two sides of the fixing shaft 100 in a radial direction, and an opening opposite to the bottom surface 121a. In a direction from the bottom surface 121a to the opening, a distance between the two side surfaces 121b gradually increases. The opening of the mounting groove 121 is relatively large, so that it is convenient for mounting the convex portion 201a into the mounting groove 121, and it can improve the assembly efficiency of the foldable support member.

Optionally, a shape of the convex portion 201a matches with a shape of the mounting groove 121. In the direction from the bottom surface 121a to the opening of the mounting groove 121, a dimension of the convex portion 201a gradually increases. A mounting opening of the convex portion 201a is relatively large, so that it is convenient for extruding the extruding block 50 into the accommodating cavity.

Optionally, a cross section of the extruding block 50 is wedge-shaped, so that it is convenient for extruding the extruding block 50 into the convex portion 201a. Optionally, a shape of the extruding block 50 matches with the shape of the convex portion 201a.

Figure 3:
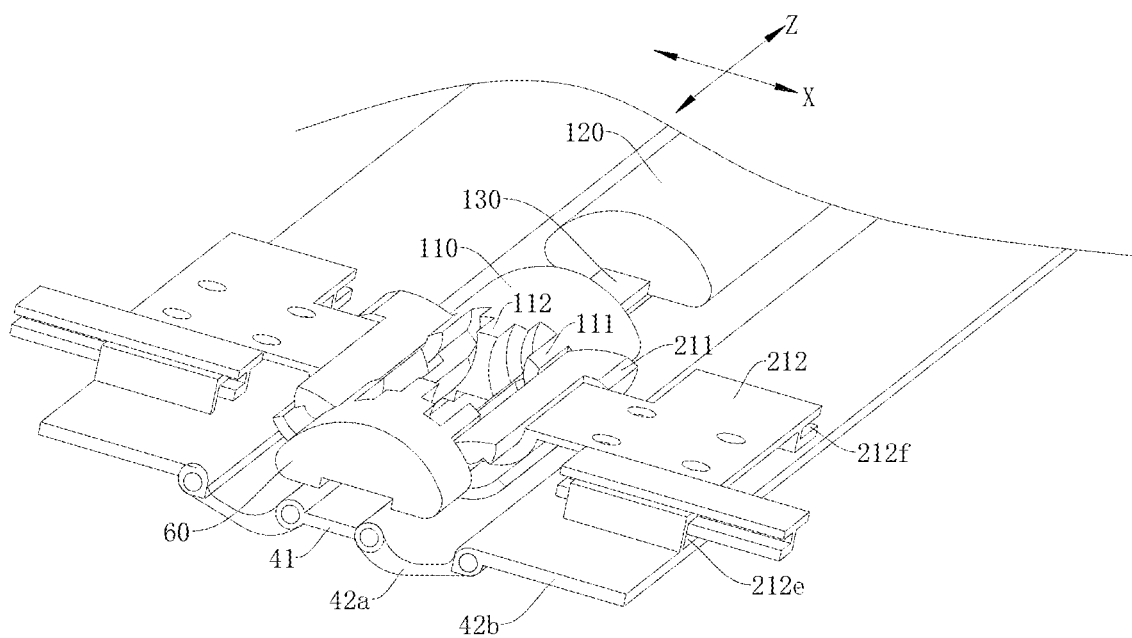
FIG. 3 shows another partial structural schematic view of a foldable member provided by an embodiment of the first aspect of the present application.

Referring to FIG. 1 and FIG. 3 together, the foldable support member 1 further includes a back cover assembly 40 located at a side of the rotating shaft portion 10 away from the support plate 20. The back cover assembly 40 includes a fixing plate 41 fixedly connected to the fixing shaft 100, a rotating plate 42 rotatably connected to the fixing plate 41; the rotating plate 42 is slidably connected to the rotating assembly 200 in the circumferential direction, and the rotating assembly 200 and the rotating plate 42 are arranged to be connected correspondingly.

In these optional embodiments, the back cover assembly 40 can provide protection for the support plate 20 and the rotating shaft portion 10. The back cover assembly 40 includes the fixing plate 41 and the rotating plate 42. The fixing plate 41 and the rotating plate 42 are rotatably connected to each other, and the rotating plate 42 and the rotating assembly 200 can be slidably arranged in the circumferential direction without causing interference to the rotation of the rotating assembly 200 around the fixing shaft 100.

There are many ways to arrange the rotating plate 42. In some embodiments, the rotating plate 42 includes a first rotating plate 42a and a second rotating plate 42b; the second rotating plate 42b is connected to the fixing plate 41 by the first rotating plate 42a; the first rotating plate 42a is rotatably connected to the fixing plate 41; the second rotating plate 42b is rotatably connected to the first rotating plate 41a.

In these optional embodiments, the rotating plate 42 includes the first rotating plate 42a and the second rotating plate 42b. The first rotating plate 42a and the second rotating plate 42b can be rotatably connected to expand a rotating angle of the foldable support member 1.

The first rotating plate 42a may be a curved plate. In the unfolding state, the first rotating plate 42a can be folded in a direction away from the rotating assembly 200, so that it can enlarge a rotating angle generated when the second rotating plate 42b is rotated from the unfolding state to the folding state.

The second rotating plate 42b is slidably connected to the rotating assembly 200 in the circumferential direction. Optionally, the back cover assembly 40 further includes a package plate 43; the package plate 43 is arranged perpendicular to the rotating plate 42; the package plate 43 is arranged at an end of the rotating plate 42 in the first direction to provide protection for the rotating shaft portion 10.

There are many ways to fold the foldable support member 1 from the unfolding state to the folding state. For example, a part of the foldable support member 1 is fixed, and the other part of the foldable support member rotates around the fixing shaft 100 by the rotating shaft portion 10, the support plate 20 and the like, so that the foldable support member 1 can be folded from the unfolding state to the folding state.

Figure 4:
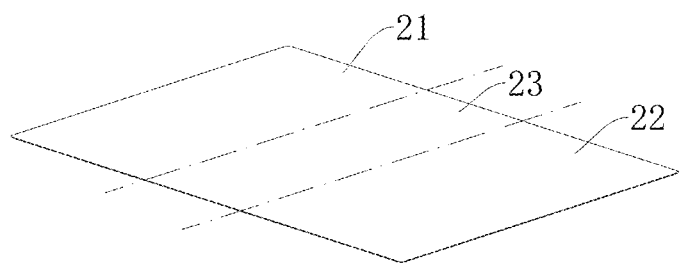
FIG. 4 shows a structural schematic view of a flexible display screen provided by an embodiment of the present application.

Referring to FIG. 1, FIG. 3 and FIG. 4 together, when the foldable support member 1 is used in a display device, and the to-be-supported member is a flexible display screen 2, the flexible display screen 2 includes a first fixing portion 21, a second fixing portion 22 and a bendable portion 23 between the first fixing portion 21 and the second fixing portion 22.

The foldable support member 1 can drive the first fixing portion 21 and/or the second fixing portion 22 to rotate around the bendable portion 23 to realize unfolding and folding of the display device. For example, the unfolding portion 202 of the support plate 20 supports the first fixing portion 21, and the rotating assembly 200, the unfolding portion 202 and the first fixing portion 21 are sequentially driven to rotate around the bendable portion 23 by the rotating plate 42.

In some other optional embodiments, there are two sets of the rotating assemblies 200; in the unfolding state, the two sets of rotating assemblies are arranged at two sides of the fixing shaft 100 in a second direction (direction X in FIG. 1) respectively, and the second direction intersects with the first direction; there are two unfolding portions 202; the two unfolding portions 202 are slidably connected to the two sets of rotating assemblies 200 in the circumferential direction respectively; in the unfolding state, the two unfolding portions 202 are arranged at two sides of the connecting portion 201 in the second direction respectively. When there are two sets of rotating assemblies 200, there are two rotating plates 42, since the rotating plates 42 and the rotating assemblies 200 are arranged to be connected in one-to-one correspondence. The rotating plates 42 are slidably connected to the rotating assemblies 200 in the circumferential direction respectively. In the unfolding state, the two rotating plates 42 are respectively arranged at two sides of the fixing plate 41 in the second direction.

In these optional embodiments, there are two rotating assemblies 200, two unfolding portion 202 and two rotating plates 42. When the foldable support member 1 is used in a display device, two sets of rotating assemblies 200, unfolding portion 202 and rotating plates 42 that engage with one another can respectively drive the first fixing portion 21 and the second fixing portion 22 to rotate around the bendable portion 23, thereby realizing the unfolding and folding of the display device.

Figure 5:
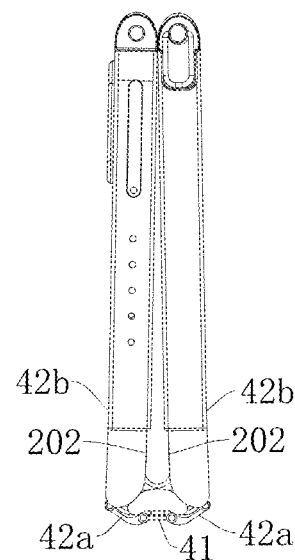
FIG. 5 shows a structural schematic view of a foldable member in an inward-folding state provided by an embodiment of a first aspect of the present application.
Figure 6:
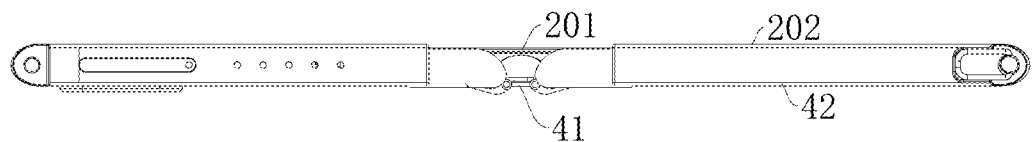
FIG. 6 shows a structural schematic view of a foldable member in an unfolding state provided by an embodiment of a first aspect of the present application.
Figure 7:
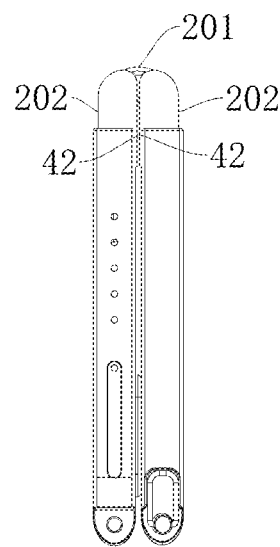
FIG. 7 shows a structural schematic view of a foldable member in an outward-folding state provided by an embodiment of a first aspect of the present application.

Referring to FIG. 5 to FIG. 7 together, for example, the folding state includes an inward-folding state and an outward-folding state. As shown in FIG. 5, in the inward-folding state, two rotating plates 42 are located at outer sides of two unfolding portions 202. As shown in FIG. 6, in the unfolding state, the support plate 20 is in a plane shape with 180 degrees. As shown in FIG. 7, in the outward-folding state, the two unfolding portions 202 are located at outer sides of the rotating plates 42.

Figure 8:
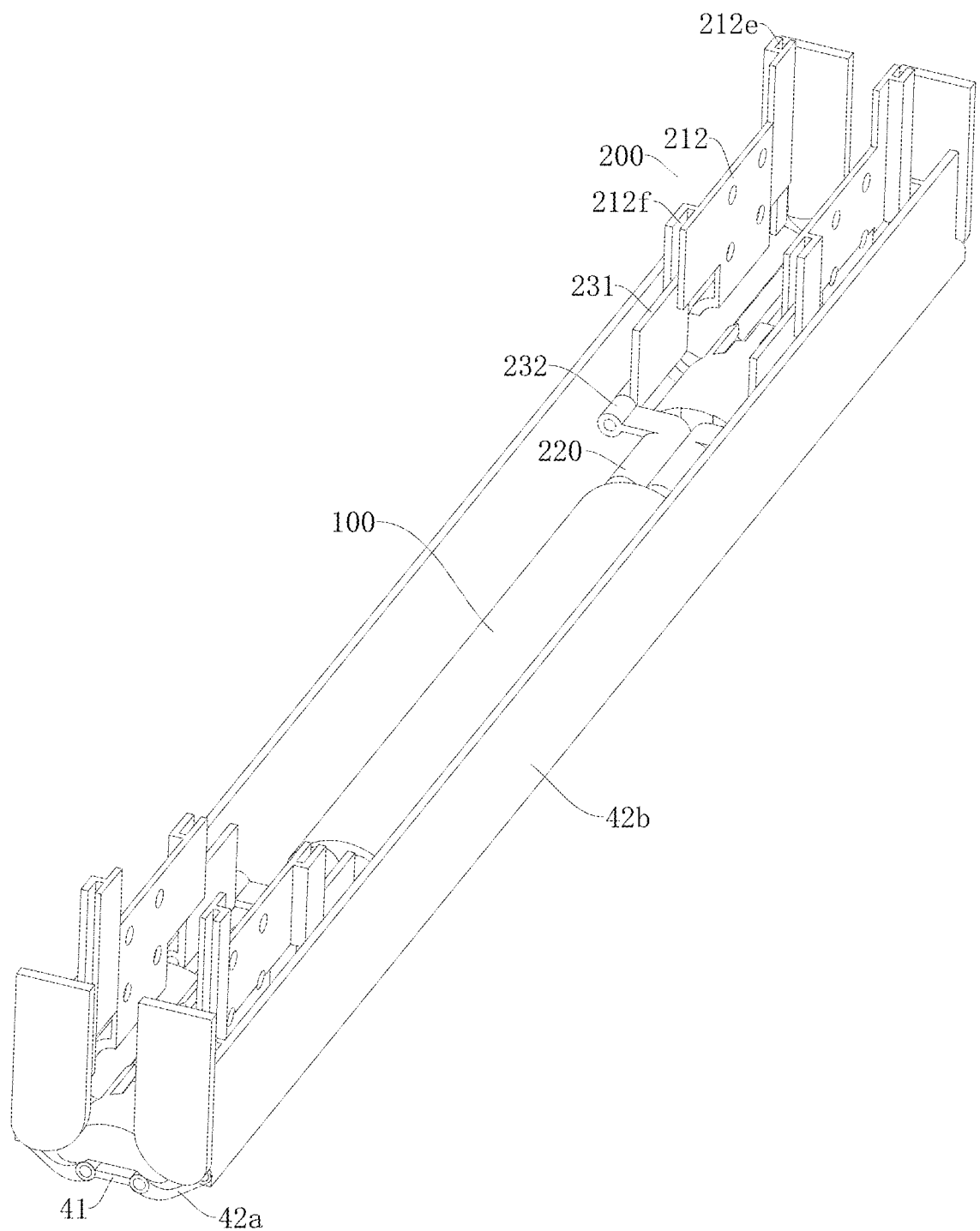
FIG. 8 shows a perspective structural schematic view of a foldable member in an inward-folding state provided by an embodiment of a first aspect of the present application.
Figure 9:
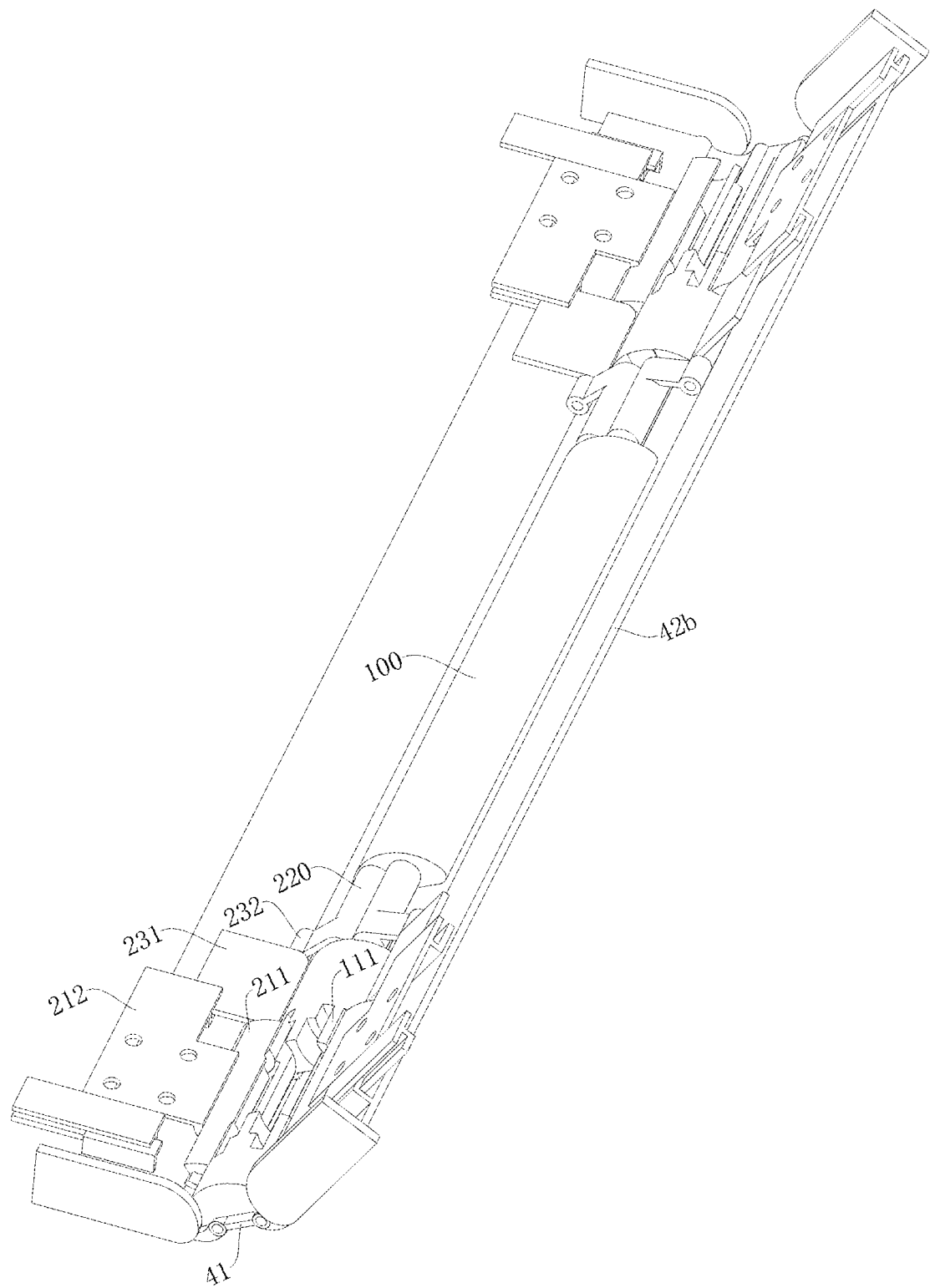
FIG. 9 shows a process view of a foldable member switched from an inward-folding state to an outward-folding state according to the embodiment of the first aspect of the present application.
Figure 10:
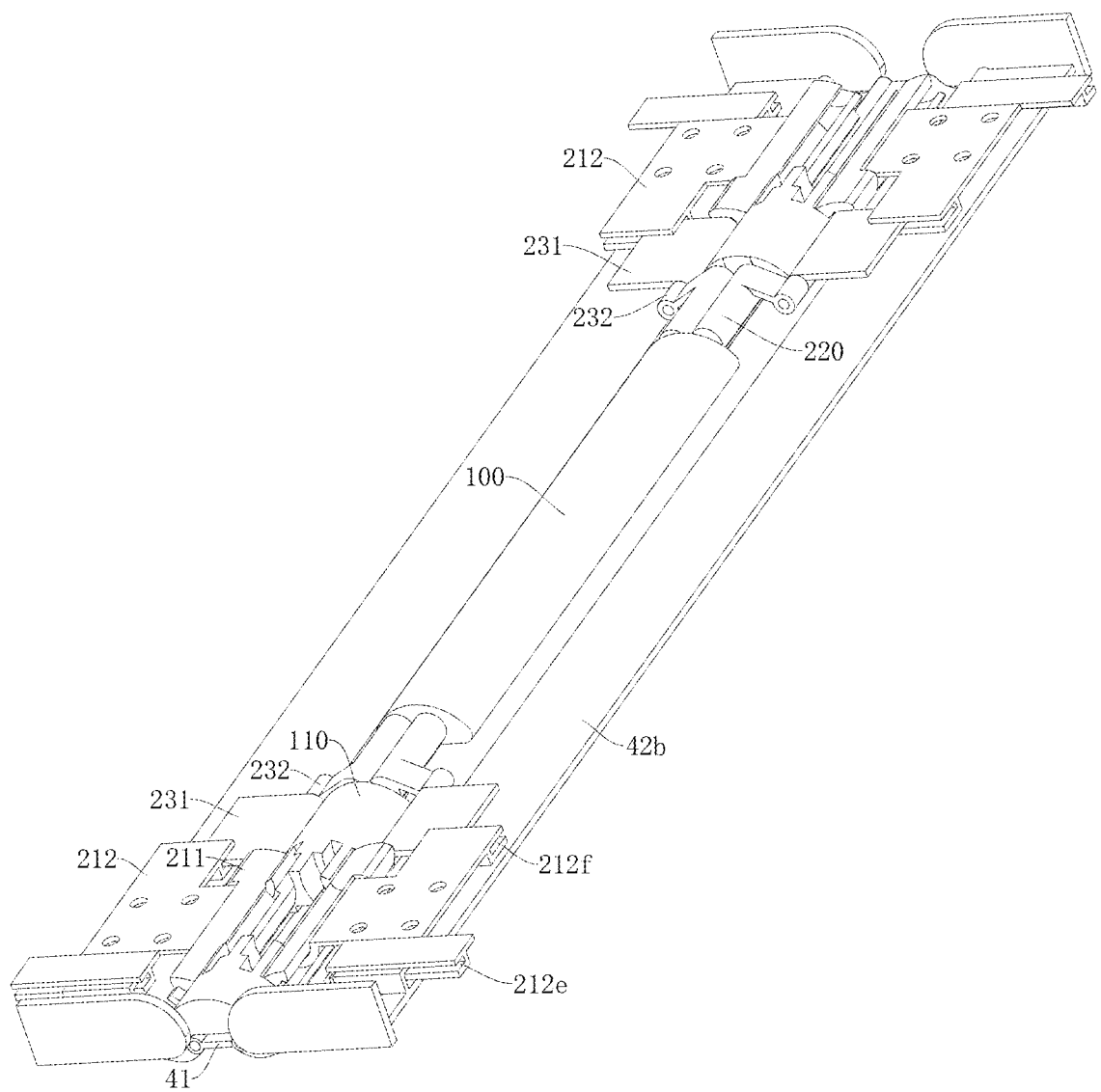
FIG. 10 shows a perspective view of a foldable member in an unfolding state provided by an embodiment of a first aspect of the present application.
Figure 11:
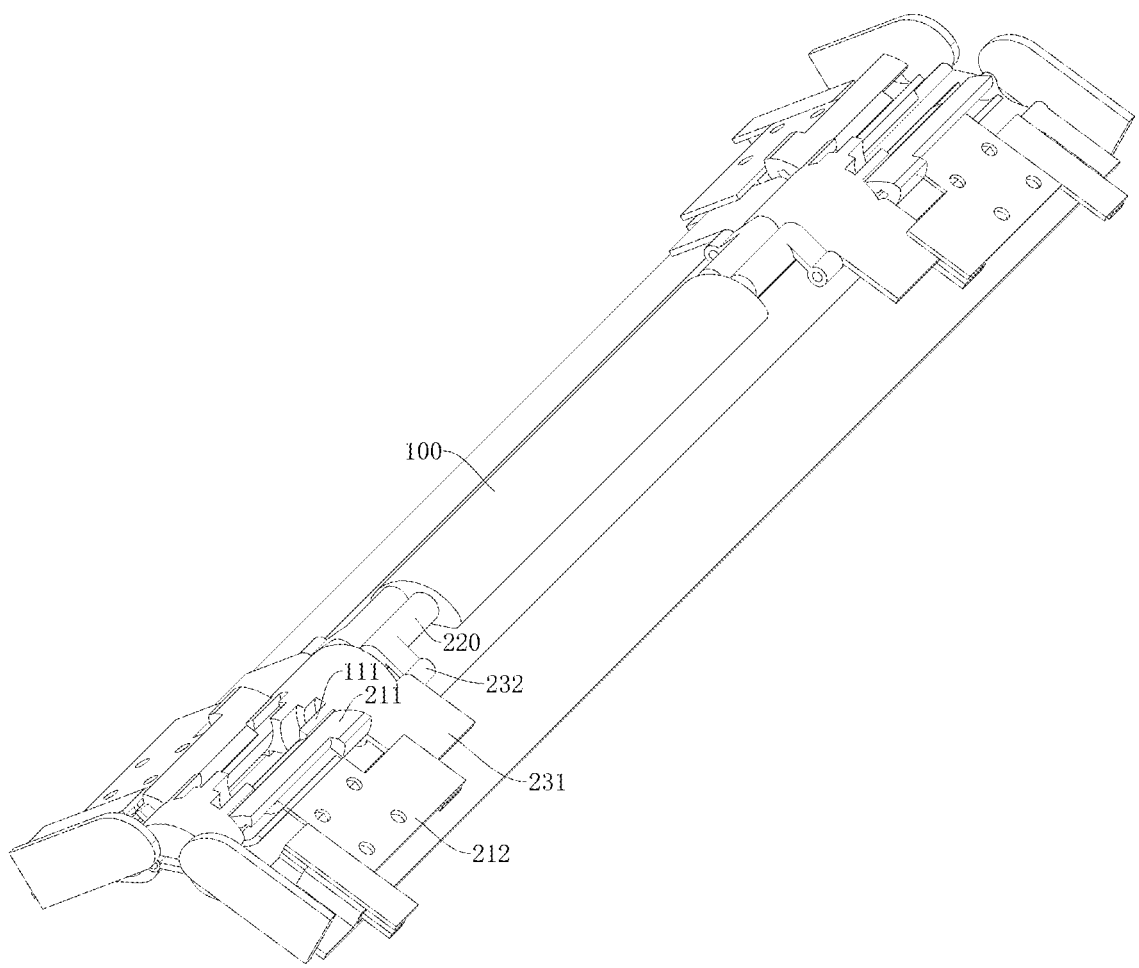
FIG. 11 shows a process view of a foldable member switched from an unfolding state to an outward-folding state according to the embodiment of the first aspect of the present application.
Figure 12:
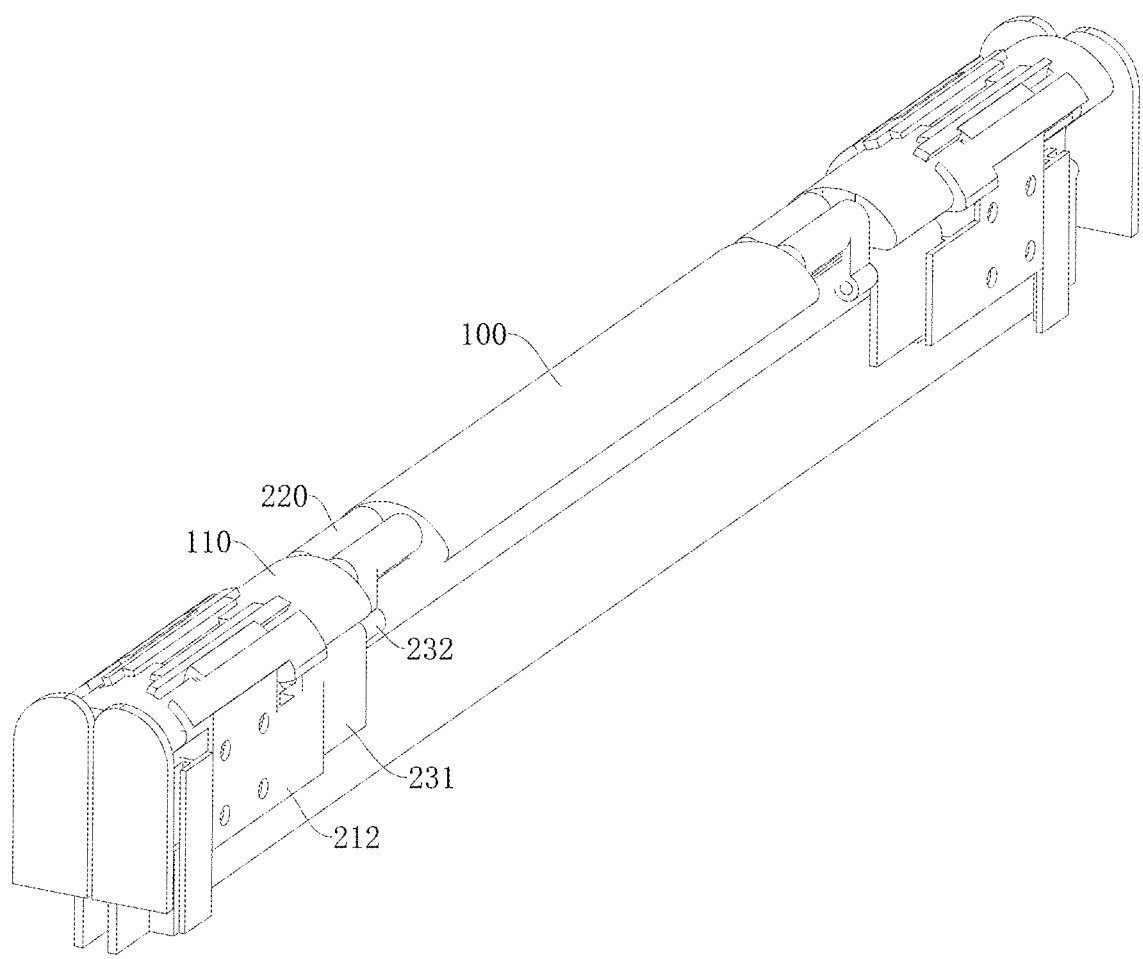
FIG. 12 shows a structural schematic view of a foldable member in an outward-folding state provided by an embodiment of a first aspect of the present application.

Referring to FIG. 8 to FIG. 12 together, a foldable member can be switched from the inward-folding state shown in FIG. 8 to the unfolding state shown in FIG. 10 via a state shown in FIG. 9. The foldable member can also be switched from the unfolding state shown in FIG. 10 to the outward-folding state shown in FIG. 12 via a state shown in FIG. 11.

In the outward-folding state and the inward-folding state, the two unfolding portions 202 are parallel to each other. Thus, each of the unfolding portions 202 need to rotate 180 degrees to realize switching from the outward-folding state to the inward-folding state.

Figure 13:
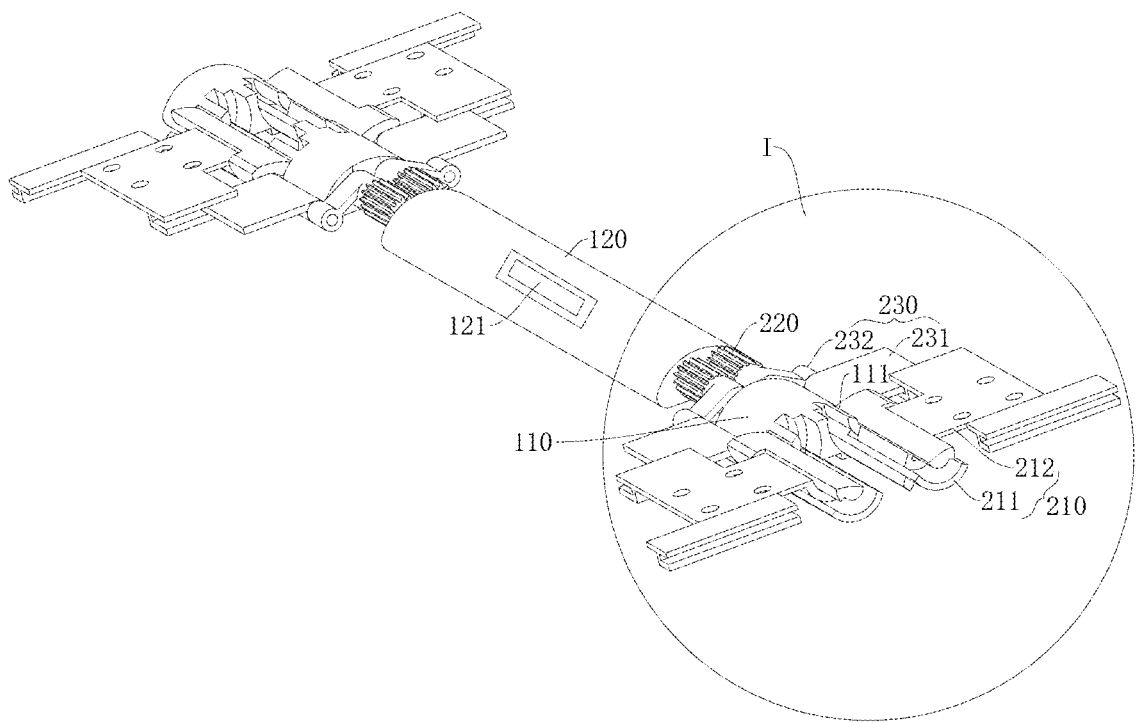
FIG. 13 shows another structural schematic view of a foldable member provided in the embodiment of the first aspect of the present application.
Figure 14:
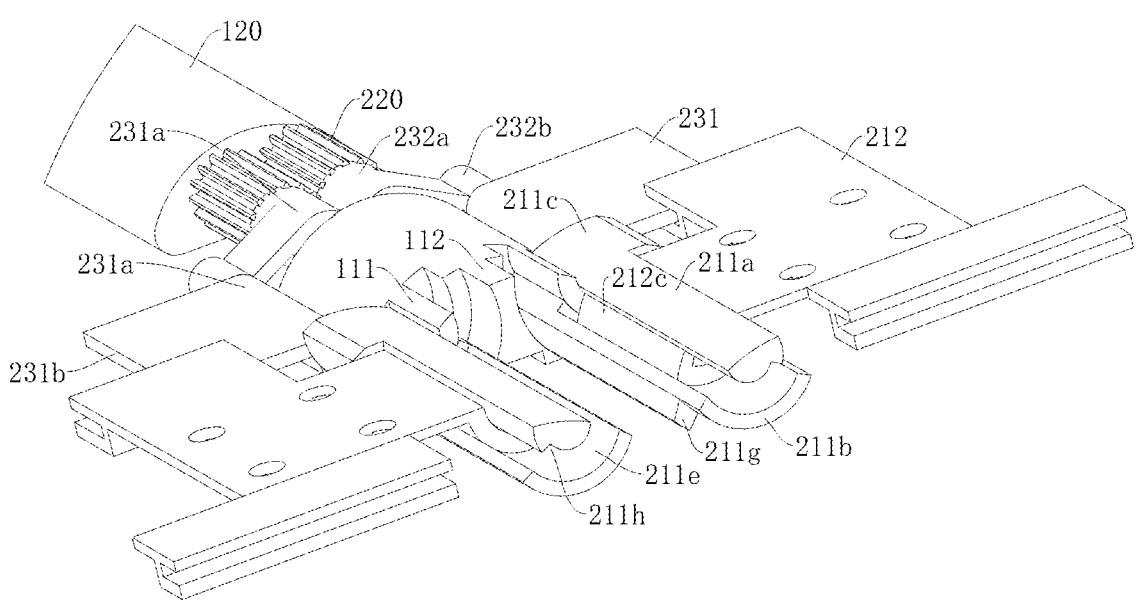
FIG. 14 shows a partially enlarged structural schematic view of at a position I in FIG. 13.
Figure 15:
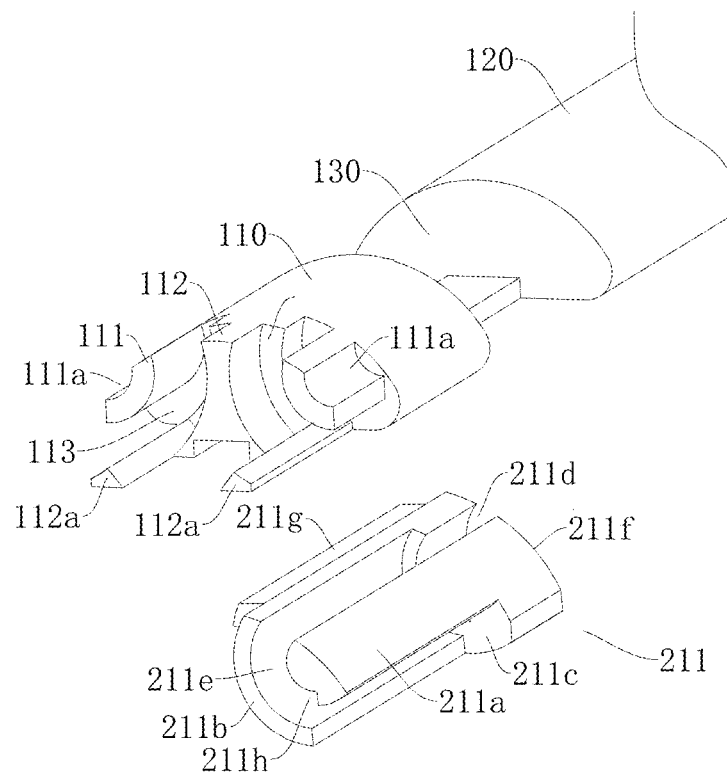
FIG. 15 shows a partially exploded view of a foldable member provided in the embodiment of the first aspect of the present application.
Figure 15:
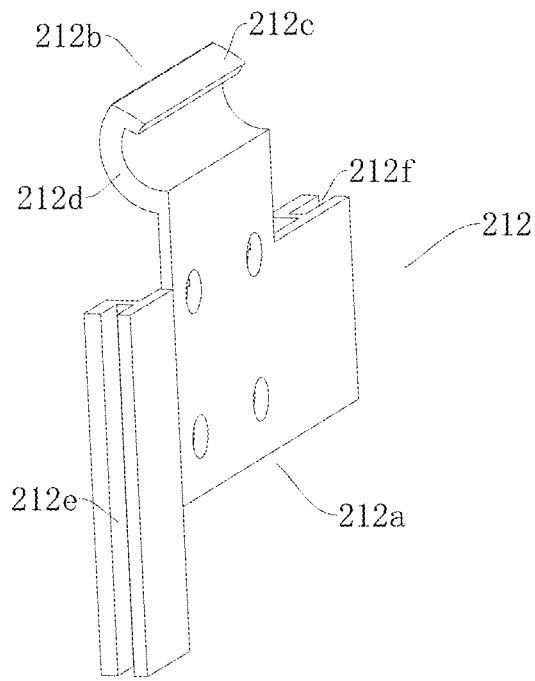

Referring to FIG. 13 to FIG. 15 together, the fixing shaft 100 includes a shaft portion 110, the shaft portion 110 includes two pivot shafts 111 arranged to be spaced apart from each other in the second direction, and the pivot shafts 111 are arranged to extend in the first direction; the two sets of rotating assemblies 200 are rotatably connected to the two pivot shafts 111 respectively, and the two pivot shafts 111 of the shaft portion 110 are arranged in parallel.

In these optional embodiments, the shaft portion 110 of the fixing shaft 100 includes two pivot shafts 111 arranged in parallel, and two sets of rotating assemblies 200 are respectively rotatably connected to the two pivot shafts 111. The two pivot shafts 111 are arranged in parallel, so that it can reduce an angle between the two unfolding portions 202 in the folding state. For example, when the two pivot shafts 111 of the shaft portion 110 are parallel to each other, the two unfolding portions 202 in the outward-folding state can be parallel to each other by rationally adjusting a distance between the two pivot shafts 111 in the shaft portion 110, so that the two unfolding portions 202 in the outward-folding state can be parallel to each other.

In some embodiments, the fixing shaft 100 includes two sets of shaft portions 110 respectively arranged at two ends of the fixing shaft 100 in the first direction, and the pivot shafts 111 are respectively connected to the rotating assemblies 200. In these optional embodiments, the shaft portions 110 are separately arranged at two ends of the fixing shaft 100 in the first direction. Thus, assemblies of the pivot shafts 111 are also respectively arranged at two ends of the fixing shaft 100, so that it can reduce the volume of the assemblies of the pivot shafts 111 and save the space. In addition, due to the assemblies of the two pivot shafts 111 at two ends of the fixing shaft 100, it can provide better support to the support plate 20, so that the stresses on the support plate 20 can be balanced.

There are many ways to arrange the rotating assembly 200. In some optional embodiments, the rotating assembly 200 includes: a rotating portion 210 rotatably connected to the pivot shaft 111, in which the unfolding portion 202 and the rotating plate 42 are slidably connected to the rotating portion 210 in the circumferential direction, an engaging portion 220 connected to the rotating portion 210, in which the engaging portion 220 is arranged rotatably, and the engaging portions 220 of the two rotating assemblies 200 connected to the same shaft portion 110 engage with each other, so that the rotating portions 210 of the two rotating assemblies 200 connected to the same shaft portion 110 is enable to rotate synchronously.

In these optional embodiments, the rotating assembly 200 is slidably connected with the unfolding portion 202 and the rotating plate 42 by the rotating portion 210. The engaging portions 220 of the two rotating assemblies 200 connected to the same shaft portion 110 engage with each other, so that the rotating portions 210 can rotate synchronously, and then drive the two unfolding portions 202 to rotate synchronously. When the foldable support member 1 is used in the display device, the first fixing portion 21 and the second fixing portion 22 can be rotated synchronously relative to the bendable portion 23, so that the display device can be switched between the unfolding state and the folding state.

There are many ways to arrange the engaging portion 220, for example, the engaging portion 220 can be a synchronous conveyor belt. Optionally, the engaging portion 220 can be a gear; the gears of two transmission assemblies connected to the same shaft portion 110 mesh with each other, and the gears of the two transmission assemblies connected to the same shaft portion 110 have the same dimension.

Optionally, a fixing groove 130 is arranged on the fixing shaft 100, and two gears meshing with each other are mounted in the fixing groove 130. The fixing groove 130 can provide protection to the gears, so as to prevent the gear from affecting the normal operation by other components.

In some embodiments, the fixing shaft 100 further includes a main body 120. The fixing groove 130 can be arranged on a side of the main body 120 in the first direction. The shaft portion 110 can be arranged at a side of the fixing groove 130 away from the main body 120. The mounting groove 121 is, for example, arranged on the main body 120. When there are two shaft portions 110, there are two fixing grooves 130, and the two fixing grooves 130 can be arranged at two sides of the main body 120 in the first direction.

A dimension of the engaging portion 220 is not limited, for example, the dimension of the engaging portion 220 can be relatively large. A rotating axis of the engaging portion 220 connected to the same rotating portion 210 overlaps with a center line of the pivot shaft 111.

In some other optional embodiments, the dimension of the engaging portion 220 can be relatively small. The rotating axes of the two engaging portions 220 corresponding to the same shaft portion 110 are located inside the center lines of the two pivot shafts 111 respectively. In other words, the rotating axes of the two engaging portions 220 corresponding to the same shaft portion 110 are located between the center lines of the two pivot shafts 111. The rotating assembly 200 further includes a transmission portion 230, one end of the transmission portion 230 is connected to the rotating portion 210, so that the rotating portion 210 is enable to drive the transmission portion 230 to rotate, the transmission portion 230 is slidably arranged in the circumferential direction relative to the rotating portion 210, and the other end of the transmission portion 230 is connected to the engaging portion 220. The rotating portion 210 drives the engaging portion 220 to rotate through the transmission portion 230.

Optionally, the transmission portion 230 includes a first transmission member 231 connected to the rotating portion 210, so that the rotating portion 210 is enable to drive the first transmission member 231 to rotate, and the first transmission member 231 can be slidably arranged in the circumferential direction relative to the rotating portion 210, a second transmission member 232 rotatably connected to the first transmission member 231 and rotatably connected to the engaging portion 220. By arranging the first transmission member 231 and the second transmission member 232, the self-locking of the transmission portion 230 can be avoided, and the foldable support member 1 can be smoothly switched between the folding state and the unfolding state.

In some embodiments, the second transmission member 232 includes a first end 232a and a second end 232b distributed to be spaced apart from each other in the circumferential direction, the first end 232a is fixed and connected to the engaging portion 220, and the second end 232b is rotatably connected to the first transmission member 231. For example, the first end 232a can be welded to the engaging portion 220, so that the second transmission member 232 can drive the engaging portion 220 to rotate.

The first transmission member 231 includes a third end 231a and a fourth end 231b distributed to be spaced apart from each other in the circumferential direction, the third end 231a is rotatably connected to the second transmission member 232, the fourth end 231b is connected to the rotating portion 210, so that the rotating portion 210 is enable to drive the transmission portion 230 to rotate by the fourth end 231b, and the fourth end 231b is slidably arranged in the circumferential direction relative to the rotating portion 210.

Optionally, each of the third end 231a of the first transmission member 231 and the second end 232b of the second transmission member 232 has a sleeve structure, so that the first transmission member 231 and the second transmission member 232 can be rotatably connected with each other by the sleeve structure.

The fourth end 231b of the first transmission member 231 may be, for example, plate-shaped. The rotating portion 210 is provided with a second sliding groove 212f. The fourth end 231b of the first transmission member 231 can be slidably arranged in the circumferential direction in the second sliding groove 212f. The rotating portion 210 can drive the fourth end 231b to rotate around the fixing shaft 100 through the second sliding groove 212f.

There are many ways to arrange the rotating portion 210. For example, the rotating portion 210 includes a rotating sleeve. The rotating sleeve is sleeved on the pivot shaft 111; the rotating portion 210 can be rotated within an angle range of 180 or more degrees around the pivot shaft 111 by the rotating sleeve.

In some other optional embodiments, due to space restricted, for example, when the foldable support member 1 is used in the display device, the space in the display device is very restricted, in order to achieve a larger rotating angle of the rotating portion 210, a multi-stage rotating member need to be provided.

Optionally, the rotating portion 210 includes a primary rotating member 211 rotatably connected to the pivot shaft 111, a secondary rotating member 212 including a rotating end 212b and a connecting end 212a, in which the rotating end 212b is rotatably connected to the primary rotating member 211, the secondary rotating member 212 is rotatably arranged around the pivot shaft 111 by the rotating end 212b, and the connecting end 212a is connected to the transmission portion 230.

In these optional embodiments, by providing the primary rotating member 211 and the secondary rotating member 212, the rotating angle of the rotating portion 210 can increase.

There are many ways to connect the primary rotating member 211 and the pivot shaft 111. For example, the shaft portion 110 further includes a position-restricting portion 112 enclosing at a surrounding side of the pivot shaft 111, the position-restricting portion 112 and the pivot shaft 111 are arranged to be spaced apart from each other to form a first rotating groove 113 between the position-restricting portion 112 and the pivot shaft 111, and the primary rotating member 211 is rotatably arranged in the first rotating groove 113.

Optionally, the first rotating groove 113 has a first opening. The first opening is located at an end of the first rotating groove 113 in the first direction, so that the primary rotating member 211 can be mounted in the first rotating groove 113 through the first opening. Optionally, the foldable support member 1 further includes a package member 60 configured to package the first opening.

Optionally, as shown in FIG. 15, the primary rotating member 211 includes a central shaft 211a, an arc portion 211b arranged around the central shaft 211a and a bottom end 211c connecting with the central shaft 211a and the arc portion 211b. The bottom end 211c is provided with an engaging groove 211d, the primary rotating member 211 is rotatably connected to the pivot shaft 111 by the engaging groove 211d, a second rotating groove 211e is formed between the central shaft 211a and the arc portion 211b, and the rotating end 212b of the secondary rotating member 212 is rotatably arranged in the second rotating groove 211e.

In these optional embodiments, the primary rotating member 211 can sleeve on the pivot shaft 111 by the engaging groove 211d, and the secondary rotating member 212 is arranged in the second rotating groove 211e. The primary rotating member 211 is rotatably arranged around the pivot shaft 111 by the engaging groove 211d, and the secondary rotating member 212 is rotatably arranged relative to the primary rotating member 211 by the second rotating groove 211e.

Optionally, the second rotating groove 211e has a second opening, the second opening is located at an end of the second rotating member in the first direction, and the secondary rotating member 212 is mounted in the second rotating groove 211e through the second opening. The second opening and the first opening are at a same side. The package member 60 can also be used to package at least part of the second opening.

Optionally, a recessed portion 111a is formed around a surface of the pivot shaft 111 away from the position-restricting portion 112, the primary rotating member 211 includes a position-restricting block 211f enclosing the engaging groove 211d, and the position-restricting block 211f is located in the recessed portion 111a. The center line of the pivot shaft 111 passes through the position-restricting block 211f. Optionally, a center axis of the arc portion 211b coincides with a center axis of the pivot shaft 111, so that the primary rotating member 211 can rotate around the pivot shaft 111 by the arc portion 211b.

In some embodiments, a first stopper 211g is arranged at an outer surface of the arc portion 211b away from the central shaft 211a, a second stopper 112a is arranged on the position-restricting portion 112, and the second stopper 112a engages with the first stopper 211g to restrict a rotating angle of the primary rotating member 211. By the engagement between the first stopper 211g and the second stopper 112a, the position restriction can be provided for the primary rotating member 211 to prevent the primary rotating member 211 from breaking away from the first rotating groove 113.

Optionally, a buckle groove 211h is formed on a surface of the central shaft 211a facing the arc portion 211b, a hook 212c is arranged at the rotating end 212b and engages with the buckle groove 211h to restrict a rotating angle of the secondary rotating member 212 through the buckle groove 211h and the hook 212c. By the engagement between the hook 212c and the buckle groove 211h, the position restriction can be provided for the secondary rotating member 212 to prevent the secondary rotating member 212 from breaking away from the second rotating groove 211e.

Optionally, the rotating end 212b includes an arc plate 212d, an outer surface of the central shaft 211a facing the arc portion 211b includes an arc surface matching with the arc plate 212d, so that the rotating end is rotatably arranged along the arc surface by the arc plate 212d. Optionally, the center axis of the arc plate 212d coincides with the center axis of the pivot shaft 111. Optionally, the hook 212c is connected to a side of the arc plate 212d away from the connecting end 212a, and the buckle groove 211h is arranged at a side of the arc surface.

In some embodiments, the secondary rotating member 212 is provided with a first sliding groove 212e, the first sliding groove 212e is formed by extending in the radial direction or a direction parallel to the radial direction, and the unfolding portion 202 of the support plate 20 is slidably connected to the first sliding groove 212e. When the unfolding portion 202 is connected to the rotating assembly 200 by the sliding portion 30, the sliding portion 30 is slidably connected to the first sliding groove 212e. The secondary rotating member 212 includes, such as, first position-restricting plates arranged to be spaced apart from each other, and the first sliding groove 212e is formed between two first position-restricting plates. The sliding portion 30 is provided with, such as, a first sliding rail 31, and the first sliding rail 31 is located in the first sliding groove 212e. By the engagement between the first position-restricting plate and the first sliding rail 31, the sliding component 30 can drive the secondary rotating member 212 to rotate around the pivot shaft 111.

Optionally, the second sliding groove 212f is also formed on the secondary rotating member 212; the second sliding groove 212f is formed by extending in the circumferential direction; the transmission portion 230 is slidably connected to the second sliding groove 212f. For example, when the transmission portion 230 includes the first transmission member 231, the fourth end 231b of the first transmission member 231 is plate-shaped. The secondary rotating member 212 includes, such as, second position-restricting plates arranged to be spaced apart from each other, and a second sliding groove 212f is formed between two second position-restricting plates. The fourth end 231b is located in the second sliding groove 212f, and the fourth end 231b engages with the second position-restricting plates, so that the secondary rotating member 212 can drive the first transmission member 231 to rotate.

The first sliding groove 212e and the second sliding groove 212f are distributed to be spaced apart from each other in the first direction. For example, the second sliding groove 212f is located at a side of the first sliding groove 212e facing the main body 120 of the fixing shaft 100.

There are many ways to arrange a position of the pivot shaft 111. In some optional embodiments, the position of the pivot shaft 111 connected to an assembly of a same set of pivot shafts 111 can be determined according to positions of the rotating plate 42 and the unfolding portion 202 connected to the assembly of the same set of pivot shafts 111 in the folding state and the unfolding state.

Figure 16:
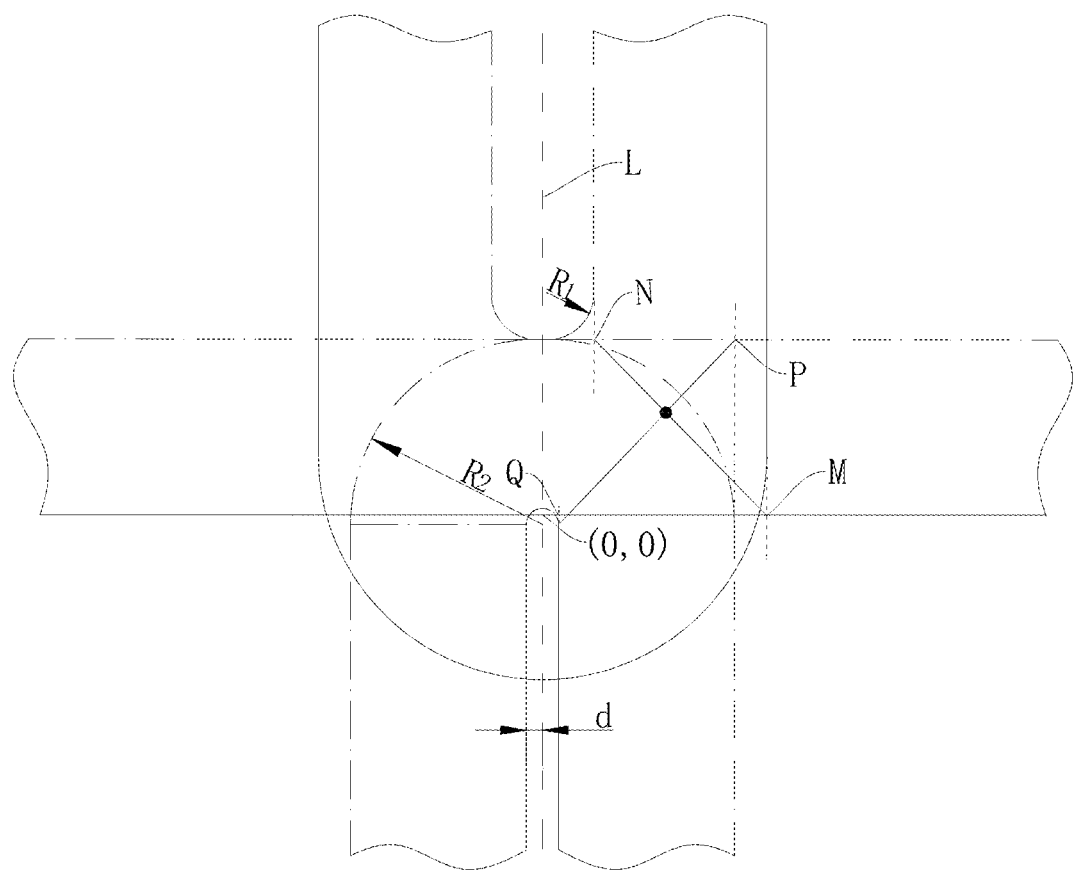
FIG. 16 shows a simplified structural view of a foldable member in different states provided by the embodiment of the first aspect of the present application.

Referring to FIG. 16, FIG. 16 shows a simplified structural view of the foldable member in different states provided by the embodiment of a first aspect of the present application. The position of the foldable support member 1 remains unchanged, and the support members are in the inward-folding state, the unfolding state and the outward-folding state. In FIG. 16, the dot-dash line indicates the positions of the support plate in the inward-folding state, the outward-folding state and the unfolding state, and the solid line represents the positions of the back cover assembly in the inward-folding state, the outward-folding state and the unfolding state. When the foldable member is used in the display device, the dot-dash line can also indicate the positions of the flexible display 2 in the inward-folding state, the outward-folding state, and the unfolding state.

A first intersecting point M is formed between an extending line of the rotating plate 42 in the inward-folding state and the rotating plate 42 in the unfolding state, a second intersecting point N is formed between an extending line of the unfolding portion 202 in the inward-folding state and the unfolding portion 202 in the unfolding state, and a first position line is formed by connecting the first intersecting point M and the second intersecting point N. A third intersecting point Q is formed between the extending line of the rotating plate 42 in the outward-folding state and the rotating plate 42 in the unfolding state, a fourth intersecting point P is formed between an extending line of the unfolding portion 202 in the outward-folding state and the unfolding portion 202 in the unfolding state, and a second position line is formed by connecting the third intersecting point Q and the fourth intersecting point P. A fifth intersecting point O' is formed by the first position line and the second position line, and a center line of the pivot shaft 111 is located at the fifth intersecting point O'.

In these optional embodiments, the position of the pivot shaft 111 can be determined by the above method, so that the 180-degree rotation of each unfolding portion 202 can be realized, and the multi-angle folding of the entire foldable support member 1 can be realized. When the foldable support member 1 is used in the display device, the support plate 20 supports the flexible display screen 2, so that it can realize the 180-degree rotation of the first fixing portion 21 and/or the second fixing portion 22 on the flexible display screen 2, and realize the multi-angle folding of the display device.

When the position of the foldable support member 1 remains unchanged, the center lines of the foldable support member in the inward-folding state, the outward-folding state and the unfolding state coincide with one another. It is assumed that a folding radius of the support plate 20 in the inward-folding state is R1, a folding radius of the support plate 20 in the outward-folding state is R2, a thickness of the foldable support member 1 is H, a distance from the rotating plate 42 to the center axis in the outward-folding state is d, an intersecting point between the back cover assembly 40 and the center axis is defined as (0, 0), and a position of the fifth intersecting point is (x, y).

In addition, when the foldable support member 1 is switched from the unfolding state to the inward-folding state, a folding center of the support plate 20 is on the first position line. When the foldable support member 1 is switched from the unfolding state to the outward-folding state, the folding center of the support plate 20 is on the second position line. Then, $$x+y=R1+H \tag{1}$$

$$x-y=t/2 \tag{2}$$

$$H+t/2=R2 \tag{3}$$

From the above formulas (1), (2) and (3), it can be achieved that:

$$x=(R1+R2)/2 \tag{4}$$

$$y=H-(R2-R1)/2 \tag{5}$$

The fifth intersecting point can be obtained according to the above formulas, and the position of the pivot shaft 111 can be determined according to the fifth intersecting point, so that the foldable support member 1 can not only be folded inwards, but also folded outwards. Therefore, the unfolding portion 202 can realize 180-degree rotation, and the foldable support member 1 can realize 360-degree folding.

Figure 17:
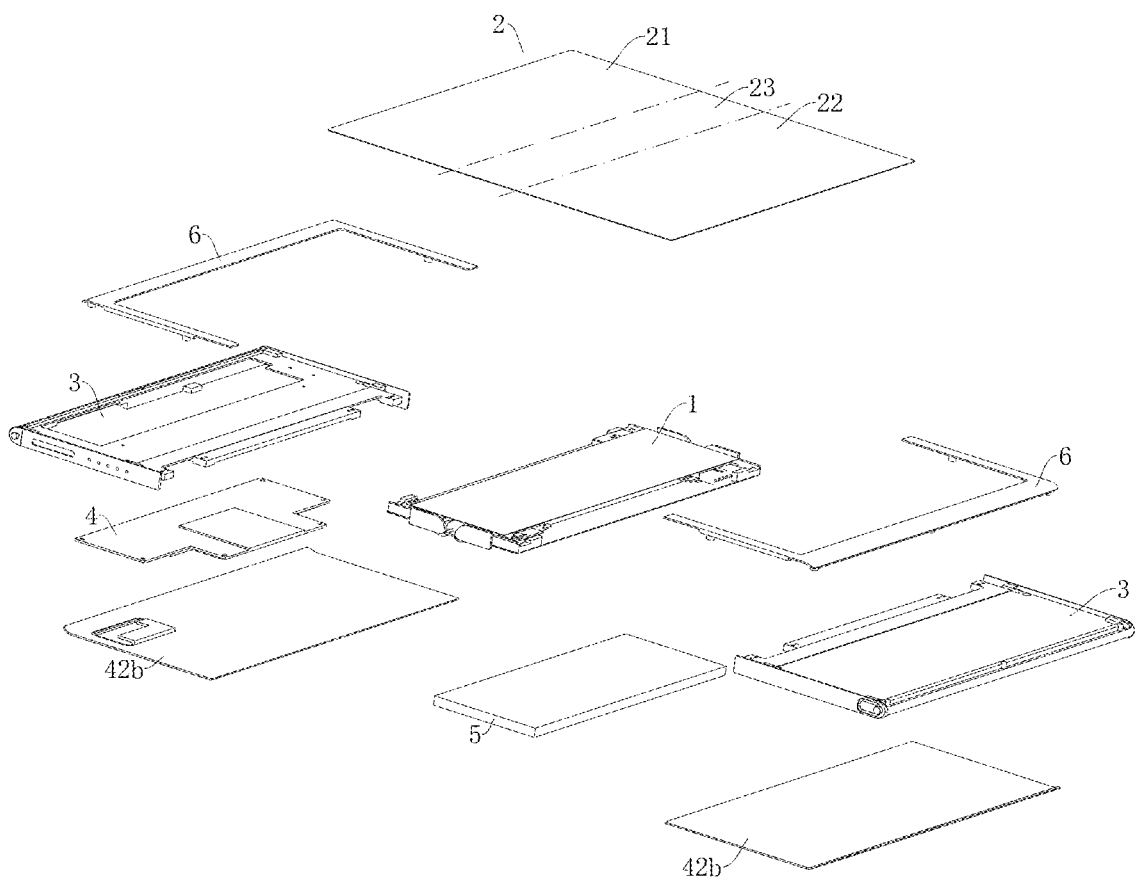
FIG. 17 shows an exploded view of a display device provided by the embodiment of a second aspect of the present application.

Referring to FIG. 17, the embodiments of a second aspect of the present application provides the display device, including the foldable support member 1 of any one of the above-mentioned embodiments of the first aspect. The display device further includes the flexible display screen 2, and the flexible display screen 2 is arranged at a side of the unfolding portion 202 away from the rotating assembly 200.

According to the display device provided by the embodiments of the present application, when the foldable support member 1 is switched between the folding state and the unfolding state, a deformation amount of the support plate 20 of the foldable support member 1 can be less, so that a deformation amount of the flexible display screen 2 can be reduced, and the service life of the flexible display screen 2 can be improved.

Optionally, the flexible display screen 2 includes the first fixing portion 21, the second fixing portion 22 and the bendable portion 23 between the first fixing portion 21 and the second fixing portion 22. At least one of the first fixing portion 21 and the second fixing portion 22 can be connected to the unfolding portion 202, and the bendable portion 23 can be arranged corresponding to the fixing shaft 100. For example, when there are two rotating assemblies 200 and two unfolding portions 202, the first fixing portions 21 and the second fixing portions 22 are respectively connected to the unfolding portions 202.

In some embodiments, a dimension of the unfolding portion 202 matches with a dimension of the first fixing portion 21 and/or the second fixing portion 22.

In some other optional embodiments, an extending dimension of the unfolding portion 202 in the circumferential direction is smaller than the dimension of the first fixing portion 21 and/or the second fixing portion 22. The unfolding portion 202 is connected to a side of the first fixing portion 21 and/or the second fixing portion 22 facing the bendable portion 23.

Optionally, the display device further includes a screen support 3, the screen support 3 can be arranged at the side of the unfolding portion 202 away from the connecting portion 201, and the screen support 3 and the unfolding portion 202 together support the first fixing portion 21 and/or the second fixing portion 22. For example, there are two screen support members 3, and the two screen support members 3 are respectively arranged at two sides of the bendable portion 23. Optionally, the display device further includes a middle frame, nesting outside the screen support 3.

The display device further includes, such as, an electrical mainboard 4 arranged at a side of the screen body support 3 away from the flexible display screen 2. The display device further includes, such as, a battery 5, and the battery 5 and the electrical mainboard 4 are respectively arranged at two sides of the bendable portion 23. The battery 5 and the electrical mainboard 4 are arranged at a side of each screen body support 3 away from the flexible display screen 2.

The display device further includes, such as, a depression bar 6, located at a side of the screen body support 3 facing the flexible display 2, and the depression bar 6 can be U-shaped.

While the application has been described with reference to the optional embodiments, various modifications may be made and equivalents may be substituted for the portions in the embodiments without departing from the scope of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A foldable support member having a folding state and an unfolding state, the foldable support member comprising:
    a rotating shaft portion, having a curved side and comprising a fixing shaft formed by extending in a first direction and at least one set of rotating assembly rotatably connected to the fixing shaft,
    a support plate, configured to support a to-be-supported member, wherein the support plate comprises a connecting portion and at least one unfolding portion connected to the connecting portion, the connecting portion is fixed to the fixing shaft, and the unfolding portion is arranged to be foldable around the fixing shaft,
    wherein the at least one unfolding portion is configured to fold in a folding direction and the curved side of the rotating shaft portion is configured to face the folding direction of the at least one unfolding portion;
    wherein the unfolding portion is slidably connected to the rotating assembly in a circumferential direction of the fixing shaft, and the unfolding portion is slidable in the circumferential direction along the rotating assembly when the foldable support member is switched between the folding state and the unfolding state.

2. The foldable support member according to claim 1, wherein the unfolding portion of the support plate is connected to the rotating assembly by a sliding portion, the sliding portion is slidably arranged relative to the rotating assembly in the circumferential direction, and the connecting portion is fixed to the sliding portion.

3. The foldable support member according to claim 1, wherein
    the at least one set of rotating assembly comprises two sets of rotating assemblies; in the unfolding state, the two sets of rotating assemblies are arranged at two sides of the fixing shaft in a second direction respectively, and the second direction intersects with the first direction;
    the at least one unfolding portion comprises two unfolding portions; the two unfolding portions are slidably connected to the two sets of rotating assemblies in the circumferential direction respectively; in the unfolding state, the two unfolding portions are arranged at two sides of the connecting portion in the second direction respectively.

4. The foldable support member according to claim 3, wherein
    the fixing shaft comprises a shaft portion, the shaft portion comprises two pivot shafts arranged to be spaced apart from each other in the second direction, and the pivot shafts are arranged to extend in the first direction;
    the two sets of rotating assemblies are rotatably connected to the two pivot shafts respectively, and the two pivot shafts of the shaft portion are arranged in parallel.

5. The foldable support member according to claim 4, wherein each of the rotating assemblies comprises
    a rotating portion, rotatably connected to the pivot shaft, wherein the unfolding portion is slidably connected to the rotating portion in the circumferential direction,
    an engaging portion, connected to the rotating portion, wherein the engaging portion is arranged rotatably, and engaging portions of the two rotating assemblies connected to the same shaft portion engage with each other, so that the rotating portions of the two rotating assemblies connected to the same shaft portion is enable to rotate synchronously.

6. The foldable support member according to claim 5, wherein the rotating portion comprises
a primary rotating member, rotatably connected to the pivot shaft, and
a secondary rotating member, comprising a rotating end and a connecting end, wherein the rotating end is rotatably connected to the primary rotating member, the secondary rotating member is rotatably arranged around the pivot shaft by the rotating end, and the connecting end is connected to the engaging portion.

7. The foldable support member according to claim 6, wherein the shaft portion further comprises a position-restricting portion enclosing at a surrounding side of the pivot shaft, the position-restricting portion and the pivot shaft are arranged to be spaced apart from each other to form a first rotating groove between the position-restricting portion and the pivot shaft, and the primary rotating member is rotatably arranged in the first rotating groove.

8. The foldable support member according to claim 7, wherein the primary rotating member comprises a central shaft, an arc portion arranged around the central shaft and a bottom end connecting with the central shaft and the arc portion, the bottom end is provided with an engaging groove, the primary rotating member is rotatably connected to the pivot shaft by the engaging groove, a second rotating groove is formed between the central shaft and the arc portion; and the rotating end of the secondary rotating member is rotatably arranged in the second rotating groove.

9. The foldable support member according to claim 8, wherein a first stopper is arranged at an outer surface of the arc portion away from the central shaft, a second stopper is arranged on the position-restricting portion, and the second stopper engages with the first stopper to restrict a rotating angle of the primary rotating member.

10. The foldable support member according to claim 8, wherein a buckle groove is formed on a surface of the central shaft facing the arc portion, a hook is arranged at the rotating end and engages with the buckle groove to restrict a rotating angle of the secondary rotating member through the buckle groove and the hook.

11. The foldable support member according to claim 8, wherein the rotating end is provided with an arc plate, an outer surface of the central shaft facing the arc portion comprises an arc surface matching with the arc plate, so that the rotating end is rotatably arranged along the arc surface by the arc plate.

12. The foldable support member according to claim 6, wherein each of the rotating assemblies further comprises a transmission portion, one end of the transmission portion is connected to the rotating portion, so that the rotating portion is enable to drive the transmission portion to rotate, the transmission portion is slidably arranged in the circumferential direction relative to the rotating portion, and the other end of the transmission portion is connected to the engaging portion.

13. The foldable support member according to claim 12, wherein the transmission portion comprises
a first transmission member, connected to the rotating portion, so that the rotating portion is enable to drive the first transmission member to rotate, and the first transmission member is slidably arranged in the circumferential direction relative to the rotating portion;
a second transmission member, rotatably connected to the first transmission member and rotatably connected to the engaging portion.

14. The foldable support member according to claim 13, wherein the second transmission member comprises a first end and a second end distributed to be spaced apart from each other in the circumferential direction, the first end is connected to the engaging portion, and the second end is rotatably connected to the first transmission member.

15. The foldable support member according to claim 13, wherein the first transmission member comprises a third end and a fourth end distributed to be spaced apart from each other in the circumferential direction, the third end is rotatably connected to the second transmission member, the fourth end is connected to the rotating portion, so that the rotating portion is enable to drive the transmission portion to rotate by the fourth end, and the fourth end is slidably arranged in the circumferential direction relative to the rotating portion.

16. The foldable support member according to claim 4, further comprising a back cover assembly, located at a side of the rotating shaft portion away from the support plate, wherein the back cover assembly comprises
a fixing plate, fixedly connected to the fixing shaft;
rotating plates, rotatably connected to the fixing plate, wherein the rotating plates are slidably connected to the rotating assemblies in the circumferential direction, and the rotating assemblies and the rotating plates are arranged to be connected in one-to-one correspondence.

17. The foldable support member according to claim 16, wherein each of the rotating plates comprises a first rotating plate and a second rotating plate; the second rotating plate is connected to the fixing plate by the first rotating plate; the first rotating plate is rotatably connected to the fixing plate; the second rotating plate is rotatably connected to the first rotating plate.

18. The foldable support member according to claim 16, wherein in the pivot shaft, the rotating plate and the unfolding portion connected to a same set of the rotating assemblies, the folding state comprises an inward-folding state and an outward-folding state;
a first intersecting point is formed between an extending line of the rotating plate in the inward-folding state and the rotating plate in the unfolding state, a second intersecting point is formed between an extending line of the unfolding portion in the inward-folding state and the unfolding portion in the unfolding state, and a first position line is formed by connecting the first intersecting point and the second intersecting point;
a third intersecting point is formed between the extending line of the rotating plate in the outward-folding state and the rotating plate in the unfolding state, a fourth intersecting point is formed between an extending line of the unfolding portion in the outward-folding state and the unfolding portion in the unfolding state, and a second position line is formed by connecting the third intersecting point and the fourth intersecting point;
a fifth intersecting point is formed by the first position line and the second position line, and a center line of the pivot shaft is located at the fifth intersecting point.

19. The foldable support member according to claim 1, wherein
a mounting groove is formed in a recess on the fixing shaft;

the connecting portion of the support plate has a convex portion and a concave portion formed on the convex portion, and the convex portion is located in the mounting groove; and the foldable support member further comprises an extruding block located in the concave portion, and the extruding block is in interference fit with the concave portion.

20. A display device, comprising the foldable support member according to claim 1.

* * * * *